United States Patent Office 3,131,995
Patented May 5, 1964

3,131,995
SODIUM PERBORATE BY THE ACTION OF SODIUM METABORATE ON HYDROGEN PEROXIDE
Max Gonze, Forest-Brussels, and Emile Leblon, Molenbeek-Saint-Jean Brussels, Belgium, assignors to Solvay & Cie., Brussels, Belgium, a Belgian company
No Drawing. Filed Apr. 17, 1959, Ser. No. 807,255
Claims priority, application France Apr. 28, 1958
9 Claims. (Cl. 23—60)

The present invention relates to a completely new and improved form of solid sodium perborate which presents numerous advantages to industry, especially a low apparent density, an excellent mobility in the dry state and particle sizes which can vary within fairly wide limits.

The invention also concerns a new process of producing this product.

It is known that sodium perborate has found at present a large market in the production of washing powders.

The sodium perborates produced industrially up to now are not entirely satisfactory. These are crystalline products having an apparent specific gravity between 0.65 and 0.75 kg./c. dm. (cubic decimeter). These products have in general a satisfactory mobility but due to their apparent specific gravity being more than twice that of the other solid constituents of the washing powders and the size of the crystals being smaller than that of the particles of the other constituents, segregations occur in the package during handling so that the sodium perborate is displaced towards the bottom of the package whereas the other constituents remain on top of it. As a result, the commercial products show a complete lack of homogeneity.

By agglomeration of crystals it is possible to produce heaps which have good mobility properties but their apparent specific gravity is, nevertheless, much too elevated.

Numerous processes have been recommended which permit sodium perborate of low apparent specific gravity to be obtained. Thus, products having only an apparent specific gravity of 0.1 to 0.2 kg./c. dm. have been obtained by effecting with vigorous stirring the crystallization of a saturated sodium perborate solution obtained by mixing hydrogen peroxide, borax and caustic soda and rapidly removing the crystals formed to avoid their growing larger. The products thus obtained are very fine, have an insufficient mobility and although light they are not suitable for the production of modern detergents.

It has also been proposed to produce sodium perborate having a low apparent specific gravity by effecting the crystallization in the form of needles. The products thus obtained may have a convenient specific gravity but their mobility is practically nil.

A new form of crystallization of sodium perborate has now been discovered which permits all disadvantages hitherto encountered to be overcome and which is particularly capable of satisfying the diverse requirements of users.

The new product is characterized by the shape and aspect of the particles forming it, its apparent specific gravity and its mobility or free flow properties.

The particles of sodium perborate forming the object of the invention are porous spheres with a smooth or rough surface. On account of the internal empty spaces these particles occupy a relatively large volume par unit of weight. Their size may vary within wide limits but the granulometric classification of the crude crystallization products is relatively narrow. According to the process which is another object of the invention, products are easily obtained of which more than 60% are classified, for example, by passing through screens, having mesh openings comprised between 0.25 and 0.70 mm. These products contain practically no fines and they may obviously be improved by screening. By modifying the working conditions in the production it is possible to produce products having larger or smaller particles while conserving the characteristics of the product, that is to say: porous spherical particles of smooth or rough surface, a low apparent specific gravity and a great mobility.

The apparent specific gravity by free flow of the new product is comprised between 0.25 and 0.50 kg./c. dm. The products constituted by particles the majority of which are comprised between 0.25 and 0.70 mm. have in general an apparent specific gravity of 0.30–0.40 kg./c. dm. when flowing freely. While conserving the average particle size it is nevertheless possible to vary the apparent specific gravity by increasing or decreasing the internal empty spaces of the particles.

The apparent specific gravity by free flow which is mentioned in the present invention is determined by a method analogous to that described in A.S.T.M. standards D392–38 and B212–48 recommended for the measurement of the apparent specific gravity of moulding powders and metallic powders, respectively. The apparatus used is, however, slightly different. It comprises a truncated-cone hopper the large base of which has a diameter of 53 mm., and the small base, provided with a total opening shutter, has a diameter of 21 mm., the height between the two bases being 58 mm. and the useful volume about 60 cc.

The cylindrical cup has a volume of 50 cc., an internal diameter of 45.2 mm. and a height substantially equal to the diameter. The base of the hopper is placed 65 mm. above the bottom of the cup. The mode of operation is identical to that described in the ASTM standards. The empty cup is weighed to the nearest 0.01 g., the shutter of the hopper is closed and the product to be tested is poured into the hopper without using an excess and while avoiding compression. The upper level of the hopper is levelled with the aid of a rule or a rectilinear blade. The cup is placed in the axis of the hopper at the indicated distance and the obturator is briskly opened in one stroke. After the material has flowed out the excess overflowing the cup is removed with the aid of a rule.

After cleaning the external walls of the cup the latter is weighed again to the nearest 0.01 g. The apparent specific gravity by free flow is equal to the weight of the material in grams divided by the volume of the cup expressed in cubic centimeters.

The determination is effected in duplicate and the arithmetical average of the results is reported.

The mobility of the product or the property of flowing freely is characterized by the flow-time of a specified quantity of the product through the orifice of the stem of a funnel.

The process is substantially analogous to that described by ASTM D392–38.

The simple apparatus is formed by a Pyrex glass funnel, viz. "short stem funnel for analysis," the angle of the cone being 60°, the internal diameter 180 mm. and the length of the stem 165 mm. The external diameter of the stem is 20 mm.

The test consists in introducing 250 g. of the product into the funnel and measuring the flow-time at the end of the stem. The products covered by the present invention are characterized by a flow-time not exceeding 10 seconds.

The sodium perborates of great mobility and of an apparent specific gravity comprised between 0.25 and 0.50 kg./c. dm. which form the object of the present invention may be prepared from aqueous solutions of sodium metaborate, hydrogen peroxide and stabilizers by contacting sodium metaborate with hydrogen peroxide in the presence of at least one of the constituents of the stabilizer, keeping the reaction medium under continuous but not rough agitation and effecting the crystallization of sodium perborate at a temperature comprised between 0 and 12° C., starting from a solution in which the relative supersaturation in perborate, expressed by the ratio between the weight of perborate virtually present in the solution and the weight of perborate normally soluble in water at 20° C., is comprised between 4 and 12.

A stabilizer is preferably used consisting of magnesium silicate which is produced "in situ" by reacting magnesium chloride or sulphate with sodium silicate. However, other stabilizers may be used, for example the reaction products of a tin stannate or halide with sulphuric, phosphoric or hydrofluoric acids; silicates of barium, of calcium, of strontium, etc.

According to an especially advantageous variant of the process the sodium metaborate solution is preferably introduced into the aqueous solution of hydrogen peroxide. The constituents of the stabilizer are dissolved in the aqueous solutions of the reagents, for example, magnesium, calcium, barium chloride or sulphate is dissolved in the aqueous solution of hydrogen peroxide, while the alkaline silicate is dissolved in the aqueous solution of sodium metaborate. The constituents of the stabilizer may, however, also be introduced in inverse order, that is to say sodium silicate into hydrogen peroxide, but in this case it is expedient to introduce the calcium, magnesium, barium etc. salts separately into the reactor, in order to prevent the formation of precipitates of hydroxides of these metals upon contact with the aqueous alkaline solution of sodium metaborate. When the alkaline earth metal chloride or sulphate is introduced into the aqueous solution of hydrogen peroxide, placed previously into the crystallization reactor, it is possible, if desired, first to introduce the sodium metaborate solution and to introduce sodium silicate only after the reagents have been mixed.

Aqueous solutions of hydrogen peroxide are used at a $H_2O_2$ concentration of 25 to 250 g./kg. so that, after addition of the sodium metaborate solution, the supersaturation in sodium perborate as specified above is comprised between 4 and 12. The $H_2O_2$-concentrations mentioned above presuppose the use of metaborate solutions at a concentration close to saturation, that is to say of about 190 g./kg. It is to be understood that the desired supersaturations are obtainable by using more highly concentrated hydrogen peroxide solutions together with more dilute metaborate solutions, but this mode of operation is essentially less economical.

When the reagents are introduced, in general at ambient temperature, the reaction mixture is brought to a temperature of between 0 and 12° C., preferably between 5 and 10° C., and stirring is continued, but not roughly, until the crystallization is terminated. The precipitate thus formed is then filtered and dried.

The mixture of the reacting solutions is advantageously effected within about 15 minutes. However, the introduction of the reagents may be effected more slowly, but too long an introduction period should be avoided if low apparent specific gravities are desired.

The time required for bringing the reaction medium to a temperature of below 12° C. has a relatively small influence on the physical properties of the product, but periods of more than about an hour should be avoided.

Stirring is continued throughout the operations, care being taken not to let it become rough. For this purpose, a stirrer ("Ancre") is preferably used, to which a little helix may be attached. It has been observed that it is desirable for the liquid to be moved in parallel layers. A peripheral stirring speed of 0.5 to 1.5 m./sec. may be maintained without essentially modifying the properties of the precipitated particles.

The quantities of reagents to be used are approximately stoichiometric quantities. A slight excess of one or the other reagent may be employed.

The sodium metaborate solution is in most cases prepared beforehand by the action of caustic soda on borax in an aqueous medium.

This method of operation permits certain impurities from the starting materials to be separated by filtration and contributes to obtain a sodium perborate of high stability. For certain special applications or if a lower stability is desired, the metaborate solution may be produced in the course of the operations, but by avoiding the presence of a momentary excess of caustic soda, which is unfavorable to the stability of the hydrogen peroxide used; for the preparation of the metaborate, a slight excess of caustic soda or borax may be used indifferently. However, an excess of caustic soda may give rise to inopportune precipitates by reaction with the alkaline earth metal salts which are in most cases employed as constituents of the stabilizers. A slight excess of borax increases the mechanical properties of the moist particles and this facilitates their handling before drying.

The following examples are given for the purpose of illustrating the process which is the object of the invention, and of making it better understood. These examples show the variable influence of the various conditions of the method of operation, but they are in no way limitative.

In all cases, the tests have been carried out in a beaker having a capacity of 3 liters which is placed in a thermostatic bath, fitted with an "Ancre" stirrer of 120 mm. diameter and revolving at variable speed.

The constituents of the stabilizer are introduced in an aqueous solution or in the crystalline state.

(1) INFLUENCE OF THE STIRRING SPEED 98.4 g. of $H_2O_2$ are placed in the beaker in the form of an aqueous solution at a concentration of 100 g. of $H_2O_2$ per kg. of solution. 2.43 g. of $MgCl_2.6H_2O$ are dissolved therein. The mixture is stirred while introducing within 60 minutes a mixture of 1003 g. of a solution having a sodium metaborate concentration of 189 g./kg. and 8.2 g. of a sodium silicate solution of 36° Bé.

When the reagents are introduced, the temperature of the thermostatic bath is brought to +3° C. within 10 minutes corresponding to a temperature of +5° C. in the reaction medium. When the crystallization is terminated, the temperature which has risen to 8–12° C. is brought back to +5° C., the particles are filtered and dried.

The characteristics of the products thus obtained are given in Table 1 as a function of the stirring speed.

*Table 1*

| Stirring speed, r.p.m. | Apparent specific gravity, kg./c. dm. | Fluidity of the product flow-time, dry | Classified product, 0.25–0.7 mm., kg./kg. of product |
| --- | --- | --- | --- |
| 230 | 0.43 | 6 | 0.33 |
| 160 | 0.37 | 5 | 0.59 |
| 106 | 0.40 | 4 | 0.65 |

It has been found that the stirring speed has only a slight influence on the apparent specific gravity so long as it does not become rough. The granulometry of the product is slightly improved, at low stirring speeds.

In contrast, if the test is repeated under the conditions indicated above, but effecting the stirring by means of a three-paddle stirrer revolving at a speed of 406 r.p.m., large crystals are obtained which are well formed but whose apparent specific gravity by flowing freely is 0.65 kg./c. dm.

(2) INFLUENCE OF THE PERIOD OF INTRODUCTION OF METABORATE

The process is carried out under the same conditions as in the examples described above, the stirring speed being fixed at 106 r.p.m. and the period of introduction of the sodium metaborate solution being variable.

*Table 2*

| Introduction period of metaborate, min. | Apparent specific gravity, kg./c. dm. | Fluidity of product flow-time, dry | Classified product, 0.25–0.7 mm., kg./kg. of product |
|---|---|---|---|
| 15 | 0.34 | 4 | 0.69 |
| 60 | 0.40 | 4 | 0.65 |
| 120 | 0.44 | 5 | 0.74 |

The specific gravity increases slightly with the increase of the introduction time of metaborate.

It is thus almost impossible to exceed essentially a period of introduction of 120 minutes under the conditions described above or else the apparent specific gravity will rise above 0.5 kg./c. dm.

It should be noted that if the reagents are kept together without lowering the temperature, crystallization still proceeds at 20° C. after a rather prolonged time, but the product thus obtained does not meet the conditions stipulated for the new product which is the object of this invention.

(3) INFLUENCE OF THE PROPORTIONS OF ALKALINE EARTH METAL SALT AND SODIUM SILICATE.

Working conditions:
Concentration of the aqueous $H_2O_2$ solution _____ g./kg__ 100
Introduction period of the metaborate solution _____ min__ 15
Cooling period of the thermostatic bath__min__ 10
Stirring speed _____ r.p.m__ 106

*Table 3*

| $MgCl_2.6H_2O$, g. | Sodium silicate, 36° Bé., g. | Apparent specific gravity, kg./c. dm. | Fluidity of product, flow-time, dry | Classified product, 0.25–0.7 mm., kg./kg. |
|---|---|---|---|---|
| 1.21 | 4.1 | 0.32 | 5 | 0.57 |
| 2.43 | 8.2 | 0.34 | 4 | 0.69 |
| 4.86 | 16.4 | 0.28 | 6 | 0.51 |
| 2.43 | 3.36 | 0.37 | 5 | 0.70 |
| 2.43 | 1.68 | 0.38 | 4 | 0.77 |

These tests show that by increasing the ratio of silicate/alkaline earth metal salt, it is possible to reduce the apparent specific gravity.

All products thus obtained are porous spheres the majority of which are hollow.

(4) INFLUENCE OF SUPERSATURATION IN SODIUM PERBORATE

Into the apparatus described above, there is introduced 1 kg. of hydrogen peroxide solution containing varying quantities of $H_2O_2$ and a quantity of $MgCl_2.6H_2O$ corresponding to 24.7 g./kg. of $H_2O_2$ employed. To this solution there are added per kg. of $H_2O_2$ used within 15 minutes, 10.2 kg. of a solution at a sodium metaborate concentration of 189 g./kg. and 8.2 g. of sodium silicate 36° Bé. within 15 minutes. Stirring is continued at a speed of 106 r.p.m.

When the whole metaborate solution is introduced, the thermostatic bath is cooled to +3° C. within 10 minutes. Stirring is continued, the liquid in the reactor being kept at a temperature of +5° C. After crystallization, the mixture which has become warm is brought back to +5° C. The product is filtered and the separated particles are dried.

*Table 4*

| Test No. | $H_2O_2$ Content of solution, g./kg. | Relative supersaturation[1] | Apparent specific gravity, kg./c. dm. | Fluidity, flowtime dry | Classified product, 0.25–0.7 mm., kg./kg. of product |
|---|---|---|---|---|---|
| 1 | 10 | 1.6 | 0.61 | | |
| 2 | 25 | 3.5 | 0.37 | 6 | 0.57 |
| 3 | 50 | 5.8 | 0.30 | 6 | 0.61 |
| 4 | 100 | 8.7 | 0.34 | 4 | 0.69 |
| 5 | 200 | 11.5 | 0.36 | 5 | 0.64 |
| 6 | 350 | 13.4 | 0.37 | | 0.45 |

[1] The relative supersaturation is the ratio between the weight of sodium perborate virtually present, and the weight of perborate which is soluble in water at 20° C.

The products obtained under the conditions of tests 3, 4 and 5 are porous spheres the majority of which are hollow. The product corresponding to test 1 consists of small cubes, whereas the products corresponding to tests 2 and 6 consist of macled crystals of the nature of crossed twins and of deformed spheres. The tests 1, 2 and 6 yield products which are not satisfactory in the fluidity test. Supersaturation leading to a good product must thus be comprised between 4 and 12.

(5) INFLUENCE OF THE STABILIZER AND THE METHOD OF ITS INTRODUCTION (a) *Test without stabilizer.*—When crystalization is effected in the complete absence of the essential elements of the stabilizer, products are obtained the physical properties of which are not satisfactory. If the cooling of the reaction medium to a temperature of about 5° C. is carried out immediately after the introduction of the reagent, crystals are obtained which are strongly agglomerated and unsatisfactory in the fluidity test.

If the reaction medium is kept at a low temperature during the introduction of the reagents, there are likewise obtained macled crystals and the apparent specific gravity exceeds 0.5 kg./c. dm.

(b) *Order of introduction of the stabilizer constituents.*—The best results are obtained by introducing the alkaline earth metal halide or sulphate into the hydrogen peroxide solution and the sodium silicate into the sodium metaborate solution, as shown in the preceding examples.

However it is also possible to work in inverse order, that is to say to introduce the sodium silicate into hydrogen peroxide, and the alkaline earth metal compounds simultaneously with the metaborate.

Into the apparatus already described, there are introduced 8.2 g. of sodium silicate of 36° Bé. and 984 g. of a solution containing 100 g. of $H_2O_2$ per kg. of solution.

To this solution there are added simultaneously but separately, within 15 minutes, 1003 g. of a solution containing 189 g. of $NaBO_2$/kg. and 50 g. of a solution containing 22.8 g. of $MgCl_2$/kg. or corresponding quantities of other alkaline earth metal compounds. When the introduction of these solutions is terminated, the thermostatic bath is cooled immediately and brought to a temperature of 3° C. within 10 minutes. After crystallization of the perborate, the solid product is separated from the mother liquor, then dried.

*Table 5*

| Test No. | Nature of alkaline earth metal salt | Apparent specific gravity, kg./c. dm. | Fluidity flowtime, dry | Classified product, 0.25–0.7 mm., kg./kg. |
|---|---|---|---|---|
| 1 | magnesium chloride | 0.29 | 6 | 0.48 |
| 2 | magnesium sulphate | 0.37 | 5 | 0.56 |
| 3 | calcium chloride | 0.32 | 6 | 0.52 |
| 4 | barium chloride | 0.34 | 5 | 0.50 |
| 5 | strontium chloride | 0.40 | 4 | 0.61 |

If desired, the mixture of the reagents may be effected in the presence of only one of the essential elements of the stabilizer, the other one being added thereafter, preferably before crystallization sets in.

In the 3 liter beaker are introduced 2.43 g. of $$MgCl_2.6H_2O$$

984 g. of a solution containing 100 g. of $H_2O_2$/kg and 1003 g. of a solution containing 189 g. of $NaBO_2$/kg.

To this solution, cooled to 5° C., there are added with stirring at 106 r.p.m. within 15 minutes 41 g. of a solution containing 200 g. sodium silicate of 36° Bé. per kg. of solution. The reaction mixture is then brought to a temperature of +5° C. The crystalline product is separated from the mother liquors and dried. It is obtained as porous spheres having the following characteristics:

Apparent specific gravity _____ 0.39 kg./c. dm.
Fluidity, flow-time _____ 5 seconds.
Classified product, 0.25–0.7 mm. _ 0.69 kg./kg. of product.

(6) ORDER OF INTRODUCTION OF METABORATE SOLUTION

According to a preferred variant of the process, the sodium metaborate solution has been introduced in all the preceding examples, into the hydrogen peroxide solution. This order may however be reversed as will be shown in the following example.

Into the crystallization apparatus are introduced 1003 g. of a metaborate solution at a concentration of 189 g./kg. and then 8.2 g. of sodium silicate 36° Bé. To this are added with stirring (stirring speed 106 r.p.m.) within 15 minutes 984 g. of a hydrogen peroxide solution at a $H_2O_2$ concentration of 100 g./kg. containing 2.45 g. of $MgCl_2.6H_2O$ per kg.

When the introduction of this solution is terminated, the thermostatic bath is cooled to +3° C. within 10 minutes.

The process is then carried out as in the preceding examples.

The product thus obtained consists of spherical agglomerates and is characterized by the following properties:

Apparent specific gravity _____kg./c. dm.___ 0.44
Fluidity, flow-time _____seconds__ 5
Classified product, 0.7–0.25 mm. _____kg./kg.___ 0.54

In all the tests described above quantities of hydrogen peroxide are used which essentially correspond to an excess of 1% with regard to the stoichiometric quantities, and the metaborate employed has been produced from stoichiometric quantities of borax and caustic soda. However, it has been found that by working with sodium metaborate containing an excess of borax of the order of 5 to 10 g./kg. of solution, it is possible to obtain the same products while improving the mechanical resistance of the moist particles.

Moreover, the sodium metaborate solution used for carrying out all the tests, has been prepared beforehand by the action of caustic soda on borax, the solution thus obtained being filtered, in order to eliminate the precipitated insoluble impurities.

It has been found that the preparation of sodium metaborate can be effected immediately before or even during the reaction with hydrogen peroxide provided that in the crystallization reactor, the caustic soda is not present in a substantial excess which would be detrimental to the stability of the hydrogen peroxide employed.

We claim:

1. An industrial product, sodium perborate in the form of porous spherical particles the apparent specific gravity of which, measured by flowing freely, is comprised between 0.25 and 0.50 kg./cubic decimeter and whose mobility, expressed by the flow-time of a weight of 250 g. through the orifice of a short stem analysis funnel of 180 mm. diameter, does not exceed 10 seconds.

2. An industrial product as defined in claim 1 wherein the majority of the particles have a size comprised between 0.25 and 0.7 mm.

3. Process for the manufacture of sodium perborate of great mobility and an apparent specific gravity between 0.25 and 0.50 kg./cubic decimeter, by the action of sodium metaborate on hydrogen peroxide in the presence of a stabilizer for said sodium perborate, said stabilizer being an alkaline-earth metal silicate, comprising the steps of contacting a sodium metaborate solution with a hydrogen peroxide solution in the presence of at least one of the constituents of the stabilizer at ambient temperature to produce a supersaturated solution in which the relative supersaturation in perborate expressed by the ratio between the weight of perborate virtually present and the weight of perborate which would normally be soluble in water at 20° C. is comprised between 4 and 12, stirring the reaction medium continuously but not roughly to displace the liquid medium continuously in parallel layers, and effecting the crystallization of the perborate by cooling the reaction medium to a temperature between 0° C. and 12° C. within a short time not exceeding one hour.

4. Process according to claim 3 wherein the stabilizer is magnesium silicate formed "in situ" from magnesium chloride and sodium silicate.

5. Process according to claim 3 wherein an alkaline earth metal salt is dissolved in an aqueous hydrogen peroxide solution containing at least 25 g. of $H_2O_2$ per kg. of solution and into this solution there is introduced a sodium metaborate solution at a concentration close to saturation and containing sodium silicate.

6. Process according to claim 3 wherein the metaborate solution is introduced into the hydrogen peroxide solution within less than 120 minutes.

7. Process according to claim 3 wherein the reaction mixture is stirred continuously but not roughly by means of an agitator revolving at a peripheral speed of 0.5 to 1.5 m./sec.

8. Process according to claim 3 wherein the sodium metaborate solution is formed during the production of the perborate by the action of caustic soda on borax in an aqueous medium.

9. Process for the manufacture of sodium perborate of great mobility and an apparent specific gravity between 0.25 and 0.50 kg./cubic decimeter, by the action of sodium metaborate on hydrogen peroxide in the presence of a stabilizer for said sodium perborate, said stabilizer being an alkaline-earth metal silicate, comprising the steps of contacting a sodium metaborate solution with a hydrogen peroxide solution in the presence of at least one of the constituents of the stabilizer at ambient temperature to produce a supersaturated solution in which the relative supersaturation in perborate expressed by the ratio between the weight of perborate virtually present and the weight of perborate which would normally be soluble in water at 20° C. is comprised between 4 and 12, stirring the reaction medium continuously but not roughly to displace the liquid medium continuously in parallel layers, and effecting the crystallization of the perborate by cooling the reaction medium to a temperature of about 5° C. within a very short time of the order of 10 to 15 minutes.

References Cited in the file of this patent
UNITED STATES PATENTS 2,937,998   Habernickel _____ May 24, 1960

FOREIGN PATENTS 761,371   Great Britain _____ Nov. 14, 1956
211,626   Australia _____ Oct. 24, 1957